(12) United States Patent
Kliger et al.

(10) Patent No.: US 9,992,748 B2
(45) Date of Patent: Jun. 5, 2018

(54) INITIAL RANGING TRANSMISSION POWER

(71) Applicant: BROADCOM CORPORATION, Irvine, CA (US)

(72) Inventors: Avraham Kliger, Ramat Gan (IL); Anatoli Shindler, Qiryat Ono (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 172 days.

(21) Appl. No.: 14/736,592

(22) Filed: Jun. 11, 2015

(65) Prior Publication Data

US 2015/0373715 A1   Dec. 24, 2015

Related U.S. Application Data

(60) Provisional application No. 62/014,867, filed on Jun. 20, 2014, provisional application No. 62/171,464, filed on Jun. 5, 2015.

(51) Int. Cl.
| | | |
|---|---|---|
| *H04W 52/18* | (2009.01) | |
| *H04W 52/36* | (2009.01) | |
| *H04W 52/50* | (2009.01) | |
| *H04L 27/26* | (2006.01) | |
| *H04W 52/24* | (2009.01) | |

(52) U.S. Cl.
CPC .......... *H04W 52/18* (2013.01); *H04W 52/36* (2013.01); *H04W 52/50* (2013.01); *H04L 27/2601* (2013.01); *H04W 52/241* (2013.01); *H04W 52/243* (2013.01)

(58) Field of Classification Search
CPC ..... H04W 52/18; H04W 52/50; H04W 52/36; H04W 52/241; H04W 52/243; H04L 27/2601
See application file for complete search history.

(56) References Cited

U.S. PATENT DOCUMENTS

| | | | |
|---|---|---|---|
| 6,603,958 B1 * | 8/2003 | Gao | H04L 27/0014 455/119 |
| 2005/0122996 A1 * | 6/2005 | Azenkot | H04L 12/2801 370/477 |
| 2009/0042510 A1 * | 2/2009 | Lee | H04W 24/10 455/39 |

(Continued)

*Primary Examiner* — Christopher Grey
(74) *Attorney, Agent, or Firm* — Garlick & Markison; Shayne X. Short

(57) ABSTRACT

A communication device (device) includes a communication interface and a processor, among other possible circuitries, components, elements, etc. to support communications with other device(s) and to generate and process signals for such communications. The device receives a ranging instruction signal, which includes an initial power and at least one power step, from another device. The device processes the ranging instruction generates a first ranging signal based on the initial power. The device then transmits the first ranging signal to the another device. When a ranging response to the first ranging signal is received from the another device, the device determines that the device is successfully ranged to the another device. Alternatively, when no ranging response is received, the device generates a second ranging signal based on the initial power and the at least one power step and transmit the second ranging signal to the another device.

20 Claims, 9 Drawing Sheets

(56) References Cited

U.S. PATENT DOCUMENTS

| | | | |
|---|---|---|---|
| 2010/0232318 A1* | 9/2010 | Sarkar | H04W 28/18 370/254 |
| 2012/0009969 A1* | 1/2012 | Park | H04W 52/10 455/522 |
| 2012/0157150 A1* | 6/2012 | Yang | H04W 52/16 455/522 |
| 2013/0116002 A1* | 5/2013 | Kim | H04W 52/146 455/522 |
| 2013/0129017 A1* | 5/2013 | Sahin | H04L 27/00 375/296 |
| 2016/0142898 A1* | 5/2016 | Poitau | H04W 72/0413 370/329 |
| 2016/0353440 A1* | 12/2016 | Lee | H04W 4/005 |

* cited by examiner

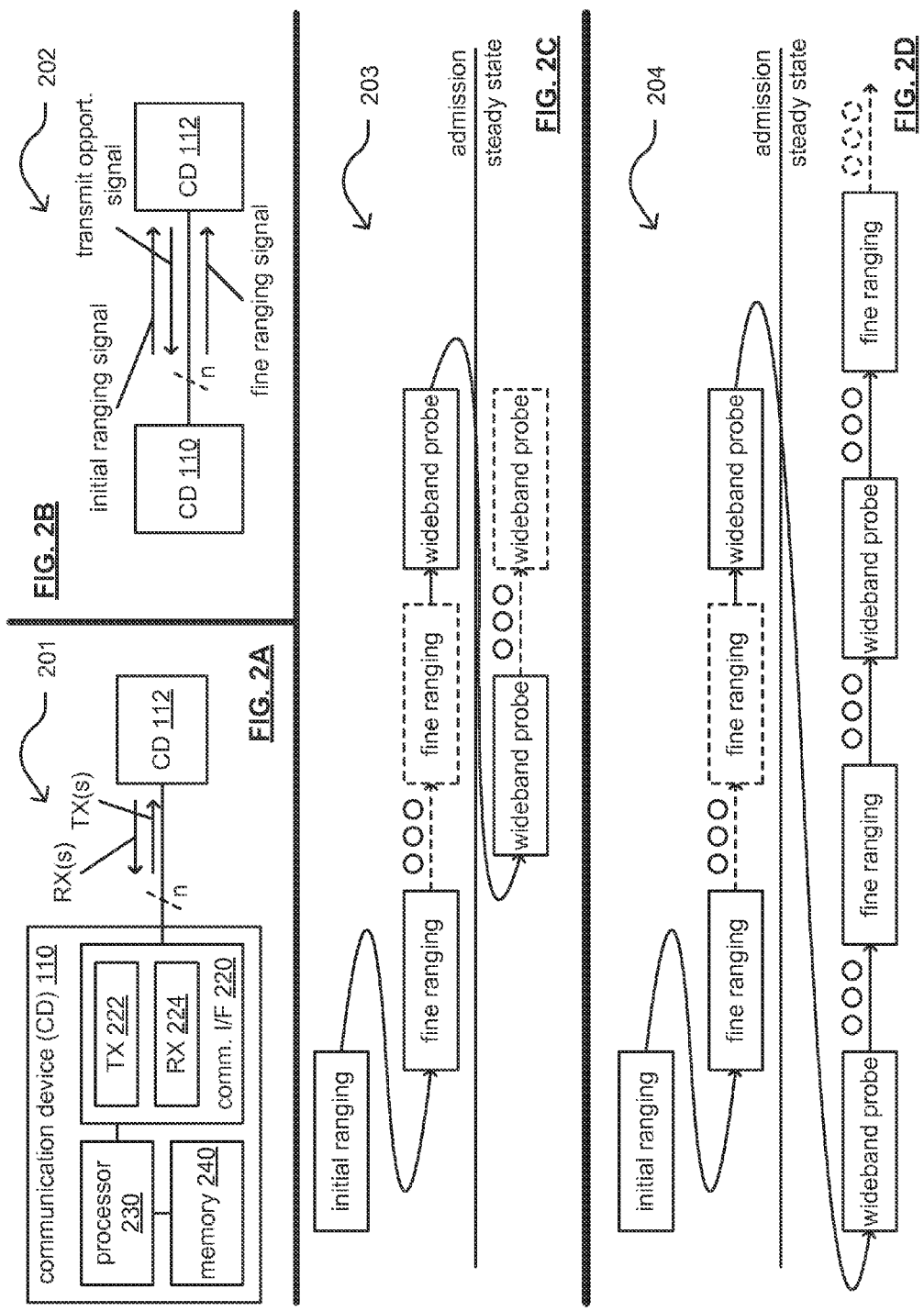

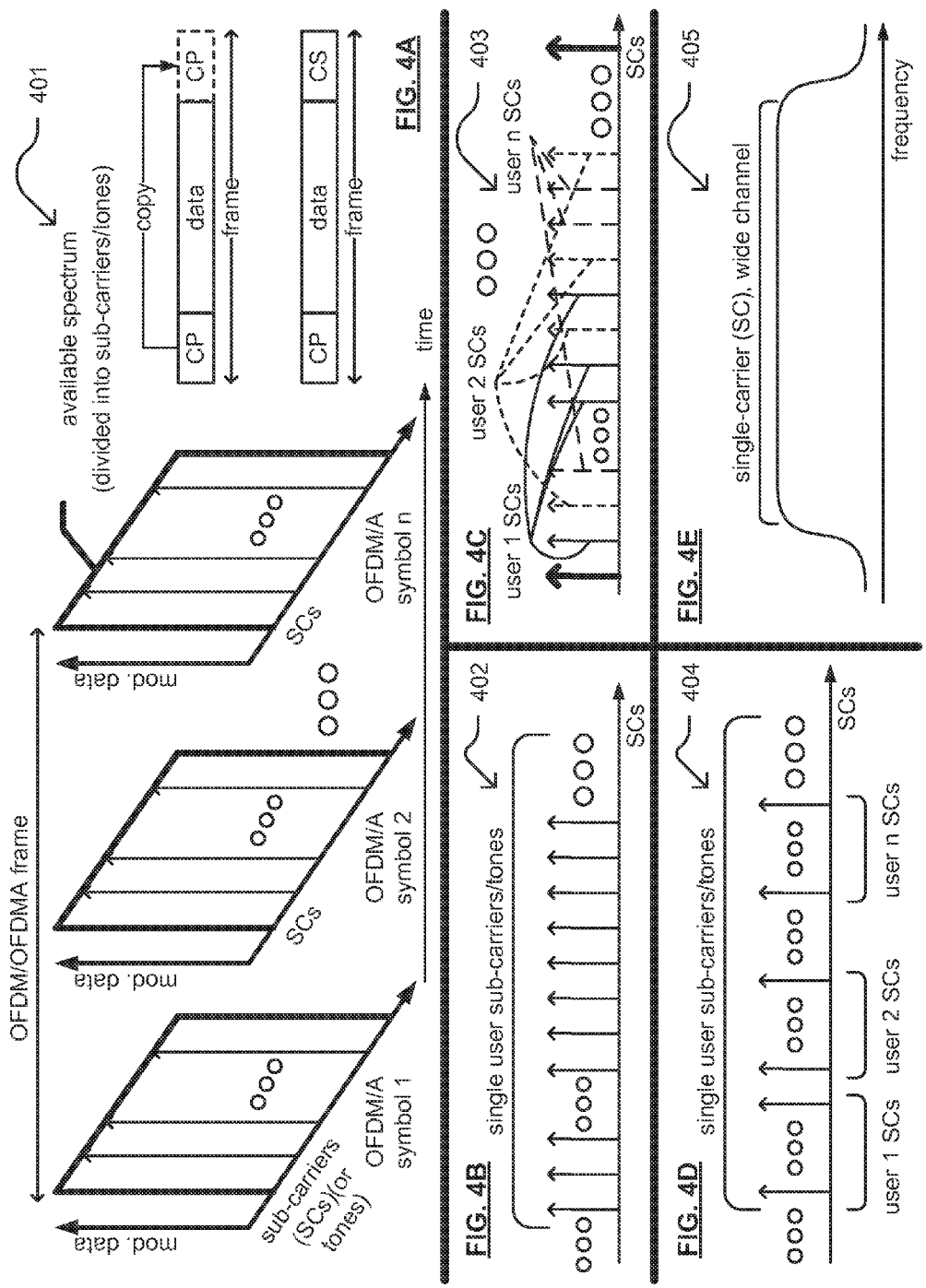

- Upstream (US) channel demodulator input power characteristics

| Modulation/constellation | Minimum set point | Maximum set point | Range |
|---|---|---|---|
| QPSK | -4 dBmV | 10 dBmV | -9 / +3 |
| 8 QAM | -4 dBmV | 10 dBmV | -9 / +3 |
| 16 QAM | -4 dBmV | 10 dBmV | -9 / +3 |
| 32 QAM | -4 dBmV | 10 dBmV | -9 / +3 |
| 64 QAM | -4 dBmV | 10 dBmV | -9 / +3 |
| 128 QAM | 0 dBmV | 10 dBmV | -9 / +3 |
| 256 QAM | 0 dBmV | 10 dBmV | -9 / +3 |
| 512 QAM | 0 dBmV | 10 dBmV | -9 / +3 |
| 1024 QAM | 0 dBmV | 10 dBmV | -9 / +3 |
| 2048 QAM | 7 dBmV | 10 dBmV | -9 / +3 |
| 4096 QAM | 10 dBmV | 10 dBmV | -9 / +3 |

FIG. 5A

- CMTS minimum CNR performance in AWGN channel

| Modulation/constellation | CNR (dB) | Set point | Offset |
|---|---|---|---|
| QPSK | 11.0 | -4 dBmV | 0 dB |
| 8 QAM | 14.0 | -4 dBmV | 0 dB |
| 16 QAM | 17.0 | -4 dBmV | 0 dB |
| 32 QAM | 20.0 | -4 dBmV | 0 dB |
| 64 QAM | 23.0 | -4 dBmV | 0 dB |
| 128 QAM | 26.0 | 0 dBmV | 0 dB |
| 256 QAM | 29.0 | 0 dBmV | 0 dB |
| 512 QAM | 32.5 | 0 dBmV | 0 dB |
| 1024 QAM | 35.5 | 0 dBmV | 0 dB |
| 2048 QAM | 39.0 | 7 dBmV | 0 dB |
| 4096 QAM | 43.0 | 10 dBmV | 0 dB |

FIG. 5B

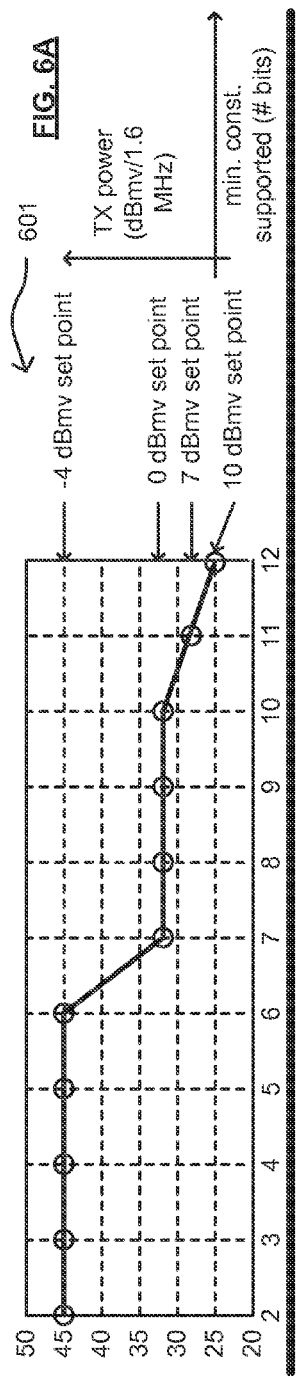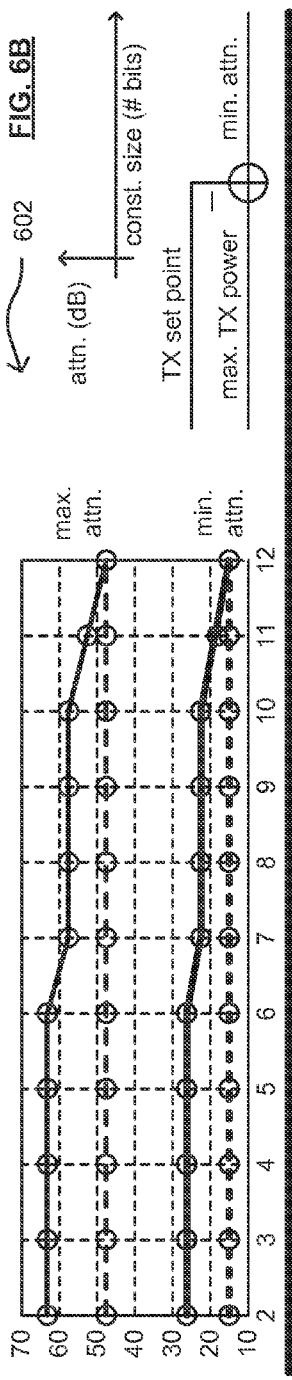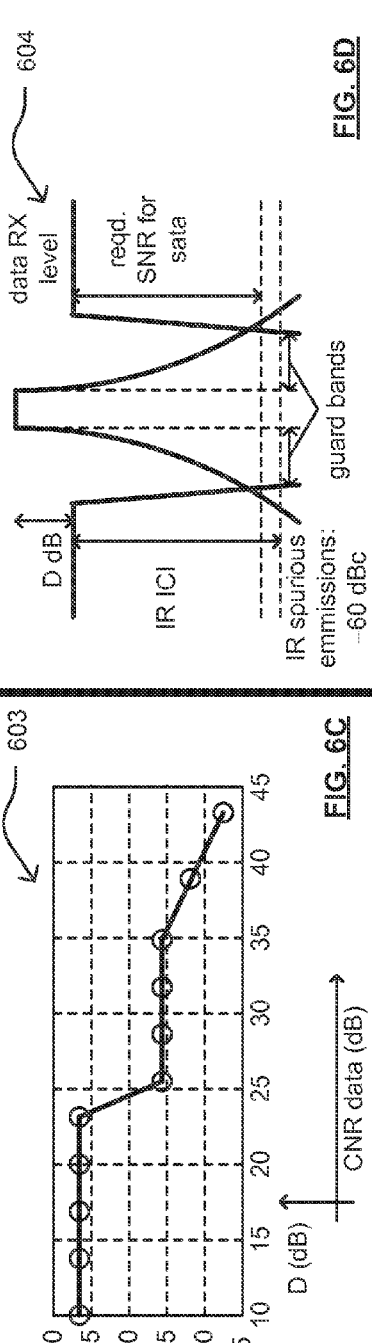

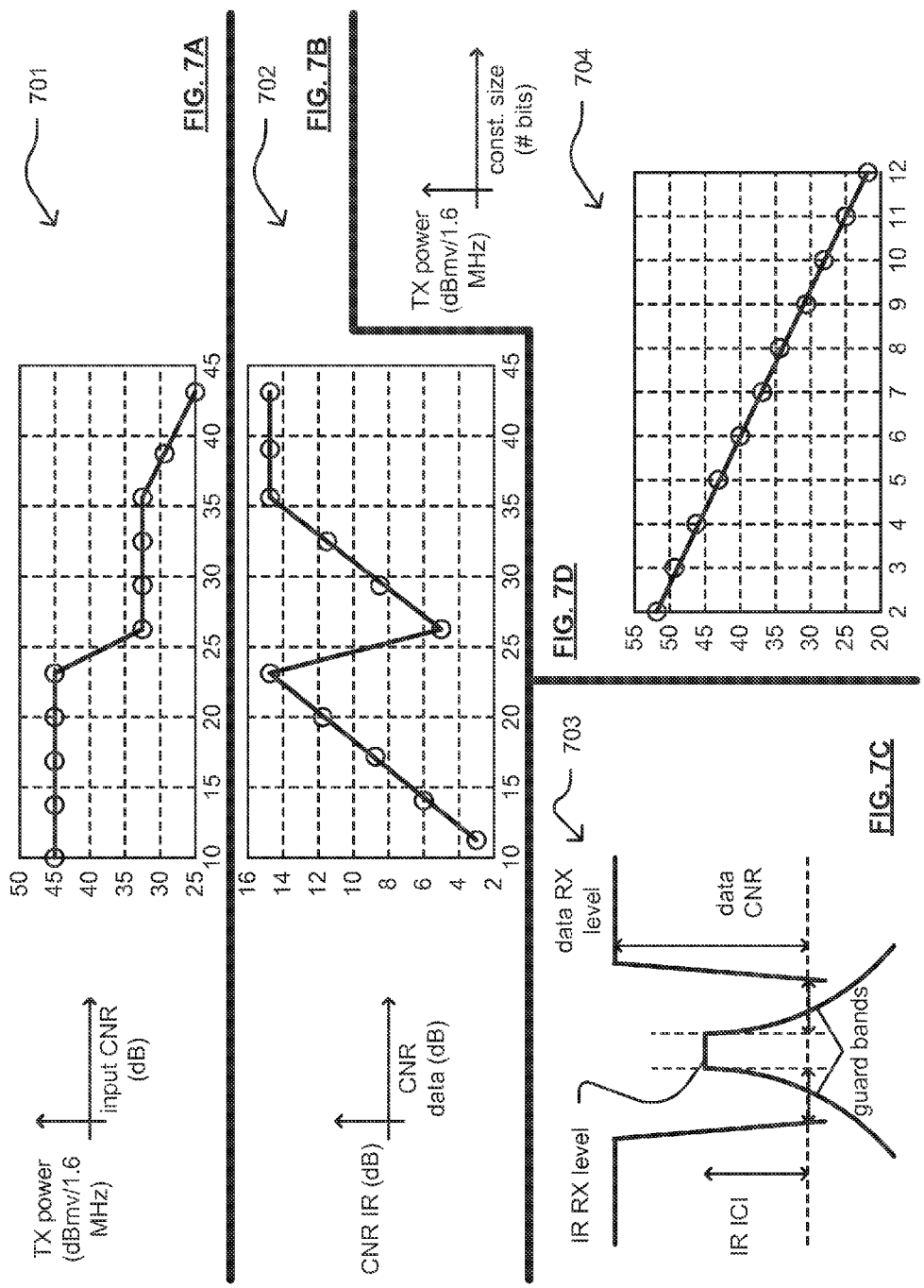

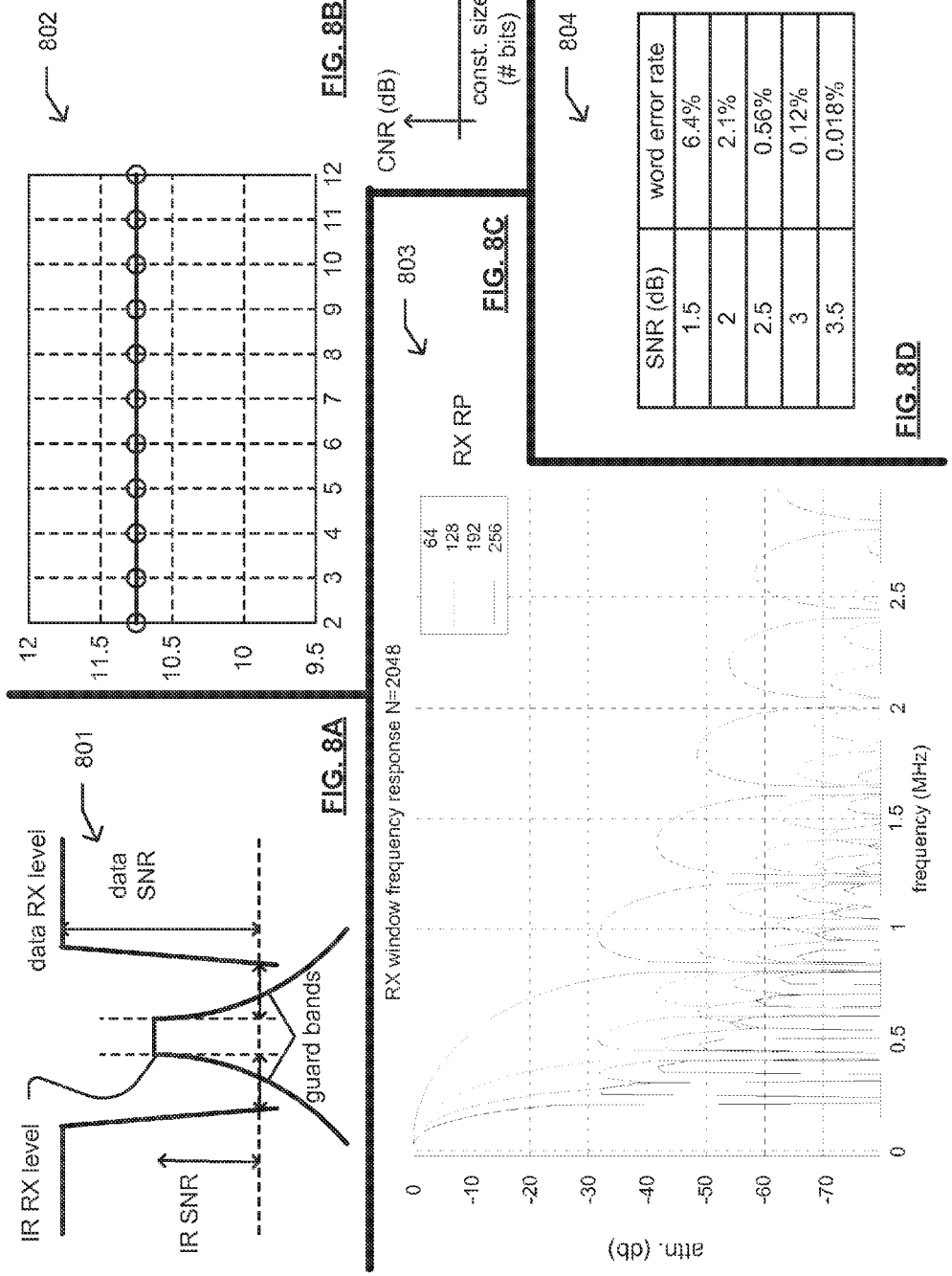

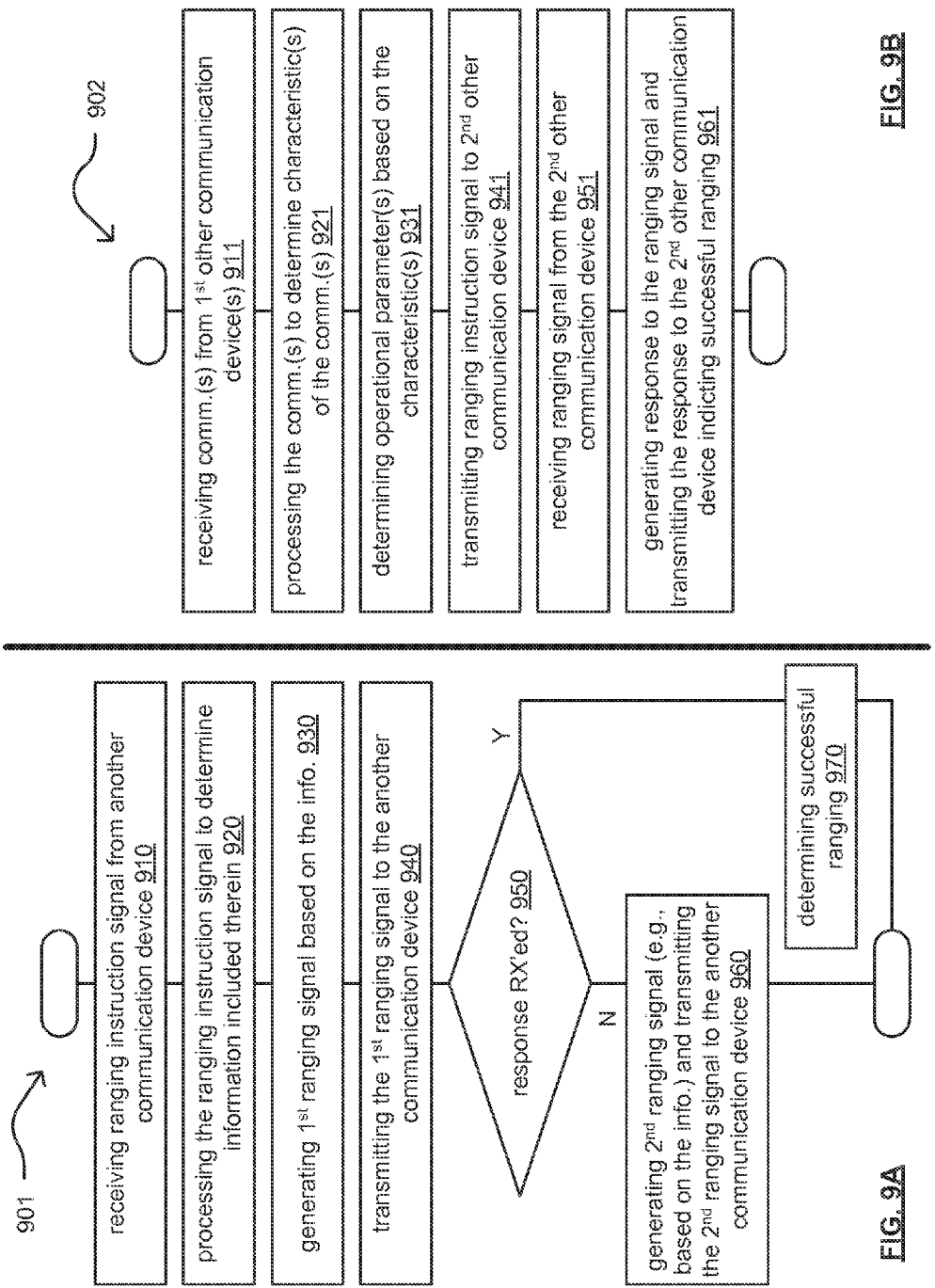

INITIAL RANGING TRANSMISSION POWER

CROSS REFERENCE TO RELATED PATENTS/PATENT APPLICATIONS

Provisional Priority Claims

The present U.S. Utility Patent Application claims priority pursuant to 35 U.S.C. § 119(e) to U.S. Provisional Application No. 62/014,867, entitled "Initial ranging transmission power," filed Jun. 20, 2014; and U.S. Provisional Application No. 62/171,464, entitled "Initial ranging transmission power," filed Jun. 5, 2015, both of which are hereby incorporated herein by reference in their entirety and made part of the present U.S. Utility Patent Application for all purposes.

BACKGROUND

Technical Field

The present disclosure relates generally to communication systems; and, more particularly, to ranging and ranging related communications within such communication systems.

Description of Related Art

Data communication systems have been under continual development for many years. The primary goal within such communication systems is to transmit information successfully between devices. Communications between devices can be governed by a number of operational parameters. One such operation that can be performed within such communication systems is ranging. Ranging is a process by which characteristics of the communication pathway between first and second communication devices can be determined.

A first communication device transmits a ranging signal to a second communication device, and the second communication device processes the ranging signal to determine one or more characteristics of the communication pathway between the first and second communication devices. Then, the second communication device communicates with the first communication device using one or more operational parameters that are selected based on the one or more characteristics of that communication pathway. Examples of such operational parameters may relate to transmission power and timing based on the distance between the first and second communication devices as well as any particular characteristics of the communication pathway between them.

Unfortunately, within many communication systems, such ranging can be problematic between the communication devices and performed very inefficiently. Generally, the first communication device attempts to connect to the communication system or network and transmits a ranging signal to the second communication device via a communication pathway within the communication system. However, the communication device may being ranging blindly, in that, the first communication device doesn't know where it is located within the communication system relative to the second communication device to which the first communication device is ranging. Because of this and other deficiencies in the prior art, the first communication device oftentimes must transmit multiple respective ranging signals before achieving any successful ranging. The prior art does not provide an adequate means by which ranging can be performed effectively and efficiently within such communication systems.

BRIEF DESCRIPTION OF THE SEVERAL VIEWS OF THE DRAWINGS

FIG. 2A is a diagram illustrating an example of a communication device (CD) operative within one or more communication systems.

FIG. 2B is a diagram illustrating another example of a CD operative within one or more communication systems.

FIG. 2C is a diagram illustrating an example of ranging signaling within one or more communication systems.

FIG. 2D is a diagram illustrating another example of ranging signaling within one or more communication systems.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 4E is a diagram illustrating an example of single-carrier (SC) signaling.

FIG. 5A is a diagram illustrating an example of upstream (US) channel demodulator input power characteristics based on DOCSIS 3.1 physical layer (PHY) specifications.

FIG. 5B is a diagram illustrating an example of cable modem termination system (CMTS) carrier to noise ratio (CNR) performance in an additive white Gaussian noise (AWGN) channel based on DOCSIS 3.1 PHY specifications.

FIG. 6A is a diagram illustrating an example of maximum transmission (TX) initial ranging (IR) power vs. received power set point.

FIG. 6B is a diagram illustrating an example of maximum and minimum supported attenuation vs. constellation size.

FIG. 6C is a diagram illustrating an example of maximum allowed IR receiver (RX) power above data RX power vs. received data CNR.

FIG. 6D is a diagram illustrating an example of guardband and window size.

FIG. 7A is a diagram illustrating another example of maximum TX IR power vs. input CNR.

FIG. 7B is a diagram illustrating an example of received IR CNR vs. data CNR.

FIG. 7C is a diagram illustrating another example of guardband and window size.

FIG. 7D is a diagram illustrating an example 704 of maximum TX IR power vs. maximum received data constellation size of other prior-ranged received CMs sharing the same OFDMA frame used for initial ranging (IR).

FIG. 8A is a diagram illustrating another example of received IR CNR vs. constellation size.

FIG. 8B is a diagram illustrating another example of guardband and window size.

FIG. 8C is a diagram illustrating an example of RX window frequency response.

FIG. 8D is a diagram illustrating an example of initial ranging forward error correction (FEC) performance.

FIG. 9A is a diagram illustrating an embodiment of a method for execution by one or more communication devices.

FIG. 9B is a diagram illustrating another embodiment of a method for execution by one or more communication devices.

DETAILED DESCRIPTION

Figure 1A:
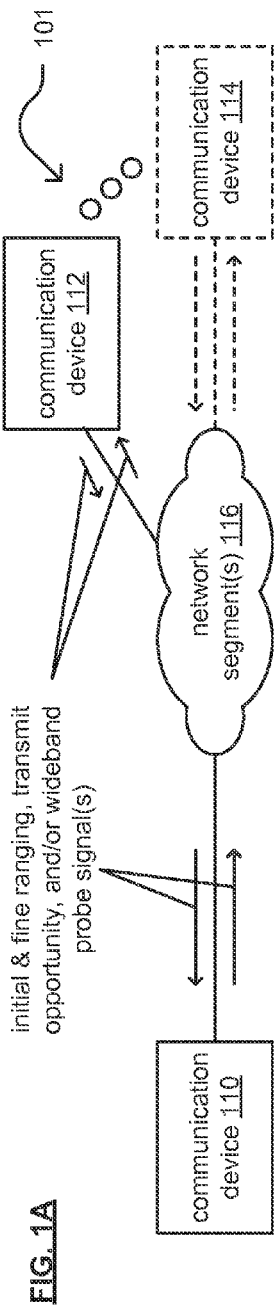
FIG. 1A is a diagram illustrating an embodiment of one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114.

In an example, device 110 includes a communication interface and a processor (and possibly other possible circuitries, components, elements, etc.) to support communications with other device(s) and to generate and process signals for such communications. The communication interface and/or the processor operate to perform various operations and functions to effectuate such communications.

In an example of operation, one of the devices, such as device 110, includes a communication interface and a processor that cooperatively operate to support communications with another device, such as device 112, among others within the system. The processor is operative to generate and interpret different signals, frames, packets, symbols, etc. for transmission to other devices and that have been received from other devices.

In an example of operation, the device 110 receives a ranging instruction signal from the device 112 that includes an initial power and at least one power step. The device then processes the ranging instruction signal to determine the initial power and the at least one power step. The device 110 then generates a first ranging signal based on the initial power. The device 110 then transmits the first ranging signal to the device 112. The device 110 then determines, when a ranging response to the first ranging signal is received from the device 112, that the communication device is successfully ranged to the device 112. Alternatively, when no ranging response to the first ranging signal is received from the device 112, the device 110 then generates a second ranging signal based on the initial power and the at least one power step and transmits the second ranging signal to the device 112.

In another example of operation, the device 110 receives receive at least one communication from the device 112. The device 110 then processes the at least one communication to determine at least one characteristic of the at least one communication. The device 110 then determines, based on the at least one characteristic of the at least one communication, an initial power and at least one power step for use by a second other communication device (e.g., the device 112) when performing ranging with the device 110. The device 110 then transmits a ranging instruction signal to the second other communication device (e.g., the device 112) that includes the initial power and the at least one power step. The device 110 then receives a ranging signal from the second other communication device (e.g., the device 112) that is based on at least one of the initial power or the at least one power step. The device 110 then generates, in response to the ranging signal, a ranging response and transmits the ranging response to the second other communication device indicating that the second other communication device (e.g., the device 112) is successfully ranged to the communication device.

Generally speaking, any desired number of communication devices are included within one or more communication systems. Some or all the various communication devices 110-114 include capability to generate one or more types of ranging signals for transmission to another one of the devices 110-114. In one example, a ranging signal is composed of a preamble followed by low density parity check (LDPC) coded bits. In another example, a ranging signal is composed of LDPC coded bits and does not include such a preamble. In an example of operation, the device 110 includes a processor configured to generate one or more signals for transmission to the other devices 110-130 via a communication interface and configured to interpret or more signals received from any of the other devices 110-130 via the communication interface. In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130.

Figure 1B:
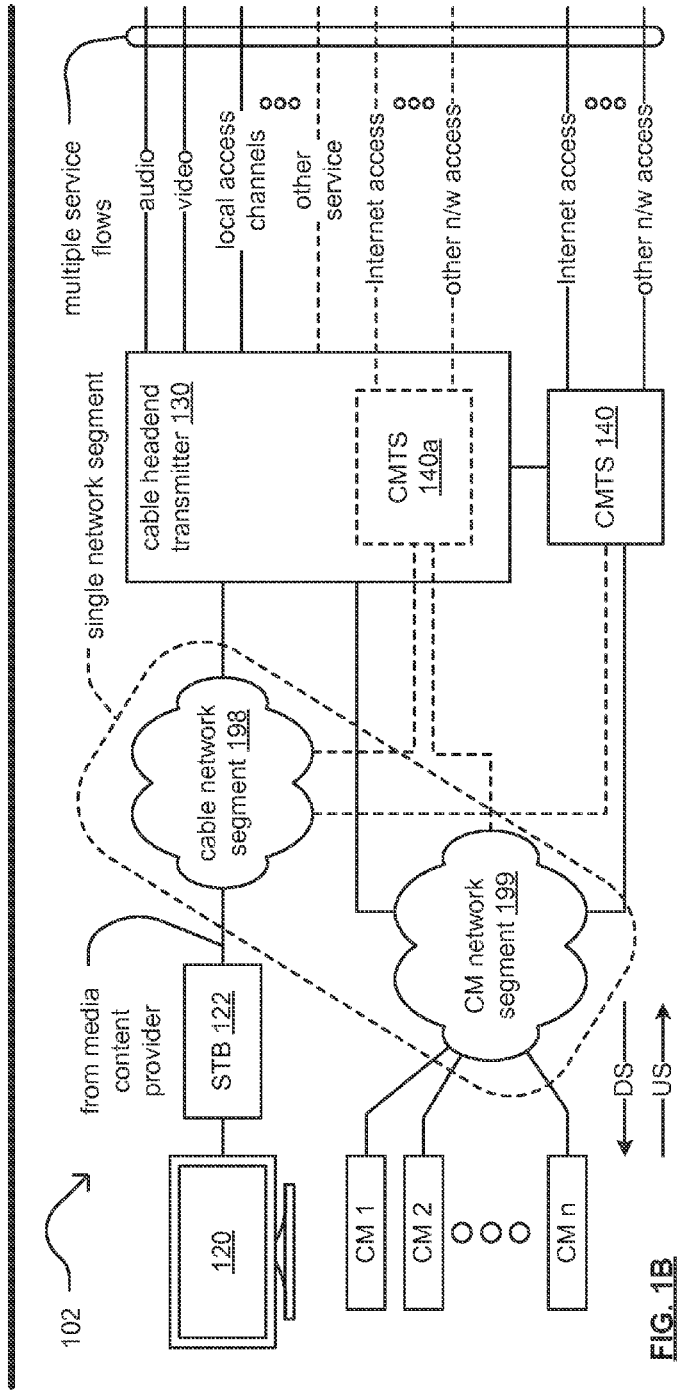
FIG. 1B is a diagram illustrating another embodiment of one or more communication systems.

FIG. 1B is a diagram illustrating another embodiment 102 of one or more communication systems. A cable headend transmitter 130 provides service to a set-top box (STB) 122 via cable network segment 198. The STB 122 provides output to a display capable device 120. The cable headend transmitter 130 can support any of a number of service flows such as audio, video, local access channels, as well as any other service of cable systems. For example, the cable headend transmitter 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140). The CMTS 140 can provide network service (e.g., Internet, other network access, etc.) to any number of cable modems (shown as CM 1, CM 2, and up to CM n) via a cable modem (CM) network segment 199. The cable network segment 198 and the CM network segment 199 may be part of a common network or common networks. The cable modem network segment 199 couples the cable modems 1-*n* to the CMTS (shown as 140 or 140a). Such a cable system (e.g., cable network segment 198 and/or CM network segment 199) may generally be referred to as a cable plant and may be implemented, at least in part, as a hybrid fiber-coaxial (HFC) network (e.g., including various wired and/or optical fiber communication segments, light sources, light or photo detection components, etc.).

A CMTS 140 (or 140a) is a component that exchanges digital signals with cable modems 1-*n* on the cable modem network segment 199. Each of the cable modems is coupled to the cable modem network segment 199, and a number of elements may be included within the cable modem network segment 199. For example, routers, splitters, couplers, relays, and amplifiers may be contained within the cable modem network segment 199. Generally speaking, downstream information may be viewed as that which flows from the CMTS 140 to the connected cable modems (e.g., CM1, CM2, etc.), and upstream information as that which flows from the cable modems to the CMTS 140.

In an example of operation, CM 1 receives a ranging instruction signal from the CMTS 140 or CMTS 140a that includes an initial power and at least one power step. The device then processes the ranging instruction signal to determine the initial power and the at least one power step. In some examples, the CMTS 140 or CMTS 140a determines the initial power and informs the CM1 of the initial power using the ranging instruction signal. CM 1 then generates a first ranging signal based on the initial power. CM 1 then transmits the first ranging signal to the CMTS 140 or CMTS 140a. CM 1 then determines, when a ranging response to the first ranging signal is received from the CMTS 140 or CMTS 140a, that the communication device was successfully received and is initially ranged to the CMTS 140 or CMTS 140a. Note that a full ranging process may include multiple processes, operations, etc. (e.g., such as including multiple operations such as initial ranging, fine ranging, etc. as in examples 203 and 204 described below with respect to FIG. 2C and FIG. 2D). Alternatively, when no ranging response to the first ranging signal is received from the CMTS 140 or CMTS 140a, CM 1 then generates a second ranging signal based on the initial power and the at least one power step and transmits the second ranging signal to the CMTS 140 or CMTS 140a. In some examples, the CM 1 transmits the second ranging signal after the elapse of a random time period from the transmission of the first ranging signal. Note that the CM 1 may be configured to transmit the second ranging signal at another time in other examples.

In another example of operation, CM 1 receives at least one communication from the CMTS 140 or CMTS 140a. CM 1 then processes the at least one communication to determine at least one characteristic of the at least one communication. CM 1 then determines, based on the at least one characteristic of the at least one communication, an initial power and at least one power step for use by a second other communication device (e.g., the CMTS 140 or CMTS 140a) when performing ranging with CM 1. CM 1 then transmits a ranging instruction signal to the second other communication device (e.g., the CMTS 140 or CMTS 140a) that includes the initial power and the at least one power step. CM 1 then receives a ranging signal from the second other communication device (e.g., the CMTS 140 or CMTS 140a) that is based on at least one of the initial power or the at least one power step. CM 1 then generates, in response to the ranging signal, a ranging response and transmits the ranging response to the second other communication device indicating that the second other communication device (e.g., the CMTS 140 or CMTS 140a) is successfully ranged to the communication device.

In another example of operation, CMTS 140 (or 140a) receives at least one communication from at least some of the CMs 1-*n*. CMTS 140 (or 140a) then processes the at least one communication to determine at least one characteristic of the at least one communication. CMTS 140 (or 140a) then determines, based on the at least one characteristic of the at least one communication, an initial power and at least one power step for use by CM 1 when performing ranging with CMTS 140 (or 140a). CMTS 140 (or 140a) then transmits a ranging instruction signal to CM 1 that includes the initial power and the at least one power step. CMTS 140 (or 140a) then receives a ranging signal from CM 1 that is based on at least one of the initial power or the at least one power step. CMTS 140 (or 140a) then generates, in response to the ranging signal, a ranging response and transmits the ranging response to the CM 1 indicating that CM 1 is successfully ranged to the communication device.

In general, note that such operations described herein with respect to ranging, including initial ranging, may be performed between any two (or more) communication devices. In some examples, the CMTS 140 (or 140a) determines the initial power for use by a CM (e.g., CM 1) when performing ranging with CMTS 140 (or 140a). However, such operations may generally be performed between any two (or more) communication devices.

FIG. 2A is a diagram illustrating an example 201 of a communication device (CD) operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., CD 112 and/or other communication devices). Operation of the communication interface 220 may be directed by the processor 230 such that processor 230 transmits and receives signals (TX(s) and RX(s)) via the communication interface 220.

Generally speaking, the communication interface 220 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 110 operates), equalization, pre-equalization, metric generation, symbol mapping and/or de-mapping, automatic gain control (AGC) operations, and/or any other operations that may be performed by an AFE and/or PHY component within a communication device.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

FIG. 2B is a diagram illustrating another example 202 of a CD 110 operative within one or more communication systems. Device 110 supports communications to and from one or more other devices, such as device 112.

In an example of operation, CD 110 generates an initial ranging signal and then transmits the initial ranging signal to CD 112 for use by the other communication device (e.g., for coarse power and timing adjustment). Then, CD 110 processes a transmit opportunity signal received from the CD 112 to identify a transmit opportunity time period. The CD 110 then generates a fine ranging signal and then transmits the fine ranging signal to the CD 112 within the transmit opportunity time period for use by the CD 112 for fine power and timing adjustment.

In another example of operation, CD 110 generates one or more wideband probes signals for transmission to another one of the devices (e.g., CD 112). These ranging signals (e.g., initial, fine, and/or wideband probes) may be transmitted upstream (US) to another one of the devices 110-114 and are also described with reference to examples such as based on FIGS. 2C and 2D. A recipient device, such as CD 112, is configured to process the received signal and transmit one or more response signals downstream (DS), such as a transmit opportunity signal, to the CD 110. Generally, the recipient device (e.g., CD 112) uses the ranging information to determine one or more operational parameters by which communications are supported with the transmitting device (e.g., CD 110).

The various communication links within the one or more network segments may be implemented using any of a variety of communication media including communication links implemented as wireless, wired, optical (e.g., including fiber-optic), satellite, microwave, etc. Also, in some instances, communication links of different types may cooperatively form a connection pathway between any two communication devices. Considering one possible example, a communication pathway between CD 110 and CD 112 may include some segments of wired communication links and other segments of optical communication links. Note also that the CDs 110-114 may be of a variety of types of devices including stationary devices, mobile devices, portable devices, etc. and may support communications for any of a number of services or service flows including data, telephony, television, Internet, media, synchronization, etc.

In another example of operation, CD 112 receives first one or more ranging signals from CD 110 and second one or more ranging signals from CD 114. CD 112 then processes those ranging signals to determine one or more characteristics of a first communication pathway between CDs 110 and 112 and a second communication pathway between CDs 112 and 114. CD 112 can select one or more operational parameters for use in subsequent communications with CDs 112 and 114. Such operational parameters may be related to transmission power and timing of such communications.

FIG. 2C is a diagram illustrating an example 203 of ranging signaling within one or more communication systems. A first device (e.g., communication device 110) transmits a ranging signal to a second device (e.g., communication device 120). The ranging process may be viewed as being divided into multiple steps. In a first step, initial ranging is used by a headend or upstream (US) communication device (e.g., communication device 120 or a cable modem termination system (CMTS) as described with reference to FIG. 2) to identify a new admitting downstream (DS) communication device (e.g., communication device 110 or cable modem (CM) as described with reference to FIG. 2) and for coarse power and timing ranging. Fine ranging is then used after initial ranging has been completed, to fine-tune timing and power. Wideband probing is used during admission of the DS communication device and steady state operation for pre-equalization configuration and transmit (TX) power and time-shift ranging.

The headend or upstream (US) communication device uses the received ranging signals to determine one or more characteristics of a communication pathway between it and the new admitting downstream DS communication device, and then may select one or more operational parameters to govern subsequent communications based on those one or more characteristics. Generally, the ranging process is a step-by-step process by which a new device is admitted and registered to the communication system to support subsequent communications with one or more other devices in the system. In this diagram, after initial ranging is completed, one or more fine ranging signals are transmitted followed by one or more wideband probes.

Figure 3A:
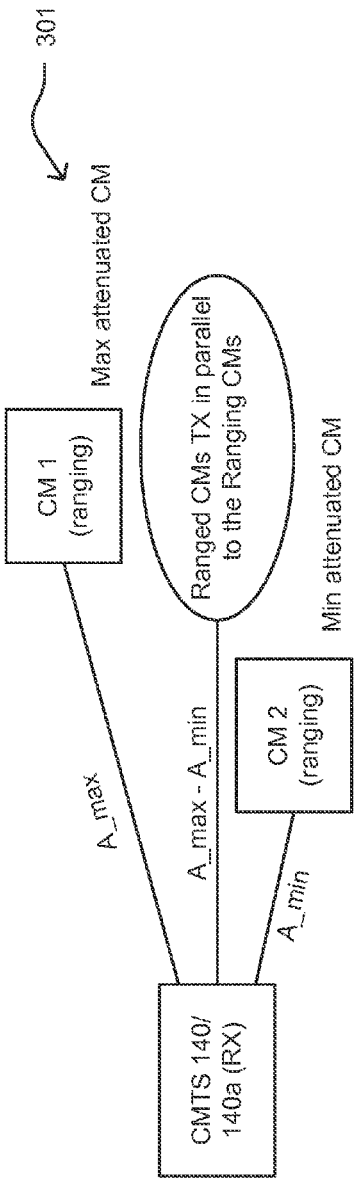
FIG. 3A is a diagram illustrating another embodiment of one or more communication systems.

FIG. 2D is a diagram illustrating another example 204 of ranging signaling within one or more communication systems. In this diagram, after initial ranging is completed, one or more fine ranging signals are transmitted followed by one or more wideband probes, and the fine ranging signals and the wideband probes are intermingled such that fine ranging signals and/or the wideband probes may be used after initial ranging is completed during the admission and steady state operational states. FIG. 3A is a diagram illustrating another embodiment 301 of one or more communication systems. This diagram shows configuration of initial ranging (IR) transmission (TX) power for various communication devices in a one or more communication systems. Generally speaking, the CMTS 140/140a supports communications with one or more other communication devices in the system (e.g., other CMs) to determine characteristics of the communication system. Examples of such characteristics include the Maximum (Max) allowed initial ranging (IR) transmit (TX) and the Minimum (Min) required IR TX power described below. From some perspectives, the CMTS 140/140a may be viewed as operating as a receiver (RX) in this mode to acquire various information regarding the communication system and to determine what information to provide to a to-be-ranged CM within a ranging instruction signal (e.g., a control signal, a management signal, etc.). The CMTS 140/140*a* operates to determine at least one characteristic of the communication system and provides a ranging instruction signal that instructs the to-be-ranged CM which initial power to use when attempting to perform ranging operations with the CMTS 140/140*a*. Based on information acquired based on the communications supported between the CMTS 140/140*a* and the one or more other communication devices in the system, the CMTS 140/140*a* can determine with a good degree of certainty an initial power for the to-be-ranged CM to use when attempting to perform ranging operations.

Some examples of the one or more characteristics ascertained and/or determined by the CMTS 140/140*a* when supporting such communications with the one or more other communication devices in the system include:

1. Maximum (Max) allowed IR TX power when the ranged CM is "close" to the CMTS (in terms of attenuation). The receive (RX) signal must be low enough to not interfere with the data from other transmitters.

2. Minimum (Min) required IR TX power when the ranged CM is "farthest" from the CMTS (in terms of attenuation). The RX SNR must be high enough to allow reception of the IR signal with a high probability.

3. The IR transmission power depends on the actual conditions of the Receiver (e.g., receive set point, Max constellation supported, and/or Guardband and receive window size).

Note that the width and receive window size can be specifies not only as a function of time but also of frequency. This can specify those sub-carriers on which the new CMs can transmit. Prior ranged CMs can use other frequencies/sub-carriers for transmissions.

Certain examples and analyses provided below assume active bandwidth of IR is 1.6 MHz: 32 OFDM/A sub-carriers with 50 kHz frequency spacing, and 64 OFDM/A sub-carriers with 25 kHz frequency spacing. Note that alternative examples can operate using a 3.2 MHz bandwidth, relatively narrower bandwidth(s), or a relatively wider bandwidth(s). In general, the CMTS can set how many and which frequencies/sub-carriers are allocated for initial ranging (IR) usage by CMs that are to-be-ranged (e.g., those CMs not yet ranged). Note also that the CMTS can set how many and which frequencies/sub-carriers are allocated for data transmission usage by the various CMs as well.

With no other knowledge, a CM needs to use some method (e.g., a proprietary algorithm, ranging 'blindly', best guess, starting from its relatively lowest transmission power, etc.) to select its transmission power (e.g., its initial ranging power). If a ranging response (e.g., a ranging response signal, RNG_RSP) is not received after a timeout, that CM would need to change its transmission power (e.g., and repeat one or more other upstream (US) ranging transmissions) until receiving a response from the CMTS. This disclosure presents a means by which the CMTS directs the initial ranging (IR) transmission power to be used by the CM so that the CM need not start transmitting at a minimal (e.g., near zero) power and increase from that point (e.g., that can unfortunately result in a number of unsuccessful ranging transmission attempts) without interfering with transmissions, communications, etc. associated with other CMs (e.g., such as based on using OFDMA transmission in the upstream (US) from at least some of the CMs to the CMTS).

Typically a timeout should be long enough to allow several attempts with the minimum power before increasing. In DOCSIS 3.0, the timeout is in order of hundreds of mSec (milli-Seconds). DOCSIS 3.0 compatible CMs select power levels with random jumps rather them starting at the bottom and gradually move up in order to reduce the time that is required to reach the appropriate level. Note also that prior DOCSIS versions operate based on single carrier (SC) signaling other CMs will not transmit when one of the CMs is performing ranging operations.

However, when operating in accordance with other communication protocols, such as DOCSIS 3.1 that operate based on orthogonal frequency division multiplexing (OFDM)/orthogonal frequency division multiple access (OFDMA), the device cannot operate by performing random jumps since such random jumps are not permissible within OFDM/A. Power must be gradually increased, starting from the lowest level, to ensure no interference to other transmitters in the same frame. Note that a first CM can transmit a ranging signal to the CMTS while or during the same time that a second CM transmits data signal to the CMTS based on OFDMA signaling. More details of OFDM/A are provided below.

Considering DOCSIS 3.1, when operating based on OFDMA signaling, many CMs can transmit upstream (US) to a CMTS. In prior versions of DOCSIS, a CM can perform ranging operations within a ranging window. This ranging window opens for several milli-seconds, and a CM can transmit a ranging signal during this time because no other CMs are transmitting. In some examples, during this window, other CMs may be configured to transmit initial ranging signals at a random time with the window, and collisions may occur as a result. Increasing the window size reduces probability of collisions yet increases the average time required initially to range all CMs that attempt to range simultaneously. As such, some examples operate such that the CMTS tries to reduce the possibility or probability of collisions while maintaining relatively low delay in transmission of transmit initial ranging signal(s) based on an optimized window size.

However, in DOCSIS 3.1, while the concept of ranging window remains, it is not same as within prior versions of DOCSIS. Because DOCSIS 3.1 employs a much larger bandwidth that versions of DOCSIS and also operates based on OFDM/A, it would be very inefficient to prohibit other CMs to transmit when one particular CM transmits a ranging signal. In some examples of DOCSIS 3.1, a to-be-ranged CM is allowed to transmit a ranging signal using a certain number of sub-carriers and other CMs (e.g., already ranged CMs) can transmit using other sub-carriers.

The CMTS directs the to-be-ranged CM which initial ranging (IR) transmission power to use so that its ranging communications do not interfere the other (e.g., data) transmissions of the other CMs. The CMTS sets the initial ranging (IR) transmission power to all new to-be-ranged CMs so that it is not too low as not to be received by the CMTS and not too high so as to interfere with transmissions of other CMs. In some examples, the CMTS directs more than one operational parameter for use by the to-be-ranged CM (e.g., number of sub-carriers to be assigned to the to-be-ranged CM, which particular sub-carriers are to be used for ranging, initial ranging (IR) transmission power, etc.).

This disclosure presents a novel approach in which the CMTS transmits information to the CM (e.g., within a ranging instruction signal) so that the CM knows which transmit power for a ranging signal transmitted from the CM will be successfully received by the CMTS.

When assuming 16 power steps that are typically required in DOCSIS 3.0 when no other knowledge, initial ranging may take as long as several Secs, which may be too high for some multiple system operators (MSOs), and the overall performance and operation of the communication system will suffer and degrade.

In some examples, novel ranging operations are presented herein that allow the CMTS 140/140a to inform the CMs (e.g., CM 1 and CM 2) the particular initial power and step to use (e.g., at least one step between the initial power and a second power that may be required, and/or between the second power and a third power that may be required, etc.). Note that the step of power is same between various ranging signals in some examples. Other examples operate by using non-uniform steps of power between various ranging signals. In some examples, if a number (e.g., m, where m is a positive integer) of unsuccessful ranging attempts are performed, the ranging CM may use a larger step (e.g., in an effort to expedite ranging sooner versus later). Alternatively, after at least one unsuccessful ranging attempt, the ranging CM may use a smaller step (e.g., based on a belief or assumption that a successful ranging attempt is soon forthcoming and not wishing to interfere with ongoing communications with other communication devices).

The CMTS 140/140s can determine the initial power and step to use based on actual system and noise conditions at the receiver (e.g., CMTS 140/140a (RX)). This can reduce the number of trials to a minimum of 1-2 trials, significantly reducing initial ranging procedure duration.

Figure 3B:
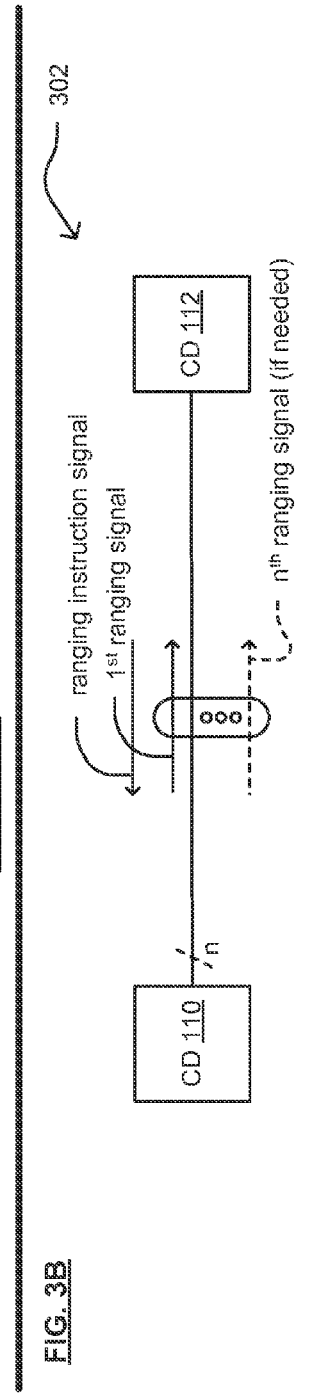
FIG. 3B is a diagram illustrating an example of a communications between CDs within one or more communication systems.

FIG. 3B is a diagram illustrating an example 302 of a communications between CDs within one or more communication systems. In this diagram, the CD 110 receives a ranging instructions signal from the CD 112 and transmits a first ranging signal to the CD 112 based on information included within the ranging instructions signal. In some examples, the CD 110 transmits more than one ranging signal to the CD 112 (e.g., up to $n^{th}$ ranging signal to the CD 112, where n is any positive integer greater than or equal to 2).

In an example of operation, the CD 110 receives a ranging instruction signal from the CD 112 that includes an initial power and at least one power step. The CD 110 then processes the ranging instruction signal to determine the initial power and the at least one power step. The CD 110 then generates a first ranging signal based on the initial power. The CD 110 then transmits the first ranging signal to the CD 112. The CD 110 then determines, when a ranging response to the first ranging signal is received from the CD 112, that the CD 110 is successfully (initially) ranged to the CD 112. The CD 110 then generates, when no ranging response to the first ranging signal is received from CD 112, a second ranging signal based on the initial power and the at least one power step and transmits the second ranging signal to the CD 112.

In another example of operation, the CD 110 generates, when no ranging response to the second ranging signal is received from the another communication device, another ranging signal based on the initial power and the at least one power step and transmits the third ranging signal to the CD 112 such that this another ranging signal has a power that is greater than a prior (e.g., initial, second, etc.) ranging signal by the at least one power step.

In another example of operation, the CD 110 receives the ranging instruction signal from the CD 112 such that this ranging instruction signal includes a receive level set point, a constellation size, a guardband width, and/or a receive window size. The CD 110 then processes the ranging instruction signal to determine the receive level set point, the constellation size, the guardband width, and/or the receive window size. The CD 110 then generates a ranging signal (e.g., a first, second, or $n^{th}$) based on the receive level set point, the constellation size, the guardband width, and/or the receive window size.

In another example of operation, the CD 112 selects the initial power based on at least one characteristic of at least one communication between the CD 112 and the CD 110 and/or any other CD(s) in the communication system so that communication(s) between the CD 112 and the CD 110 are unaffected by the ranging signal(s). Examples of such at least one characteristic corresponds to inter-code interference (ICI), inter-symbol interference (ISI), a minimum signal to noise ratio (SNR) used for data, an attenuation level, an orthogonal frequency division multiplexing (OFDM) sub-carrier assignment, and/or an orthogonal frequency division multiple access (OFDMA) sub-carrier assignment.

In another example of operation, the CD 110 transmits the first ranging signal to the another communication device using a first at least one orthogonal frequency division multiplexing (OFDM) sub-carrier or at least one orthogonal frequency division multiple access (OFDMA) sub-carrier when at least one other communication device transmits at least one other signal to the another communication device using a second at least one OFDM sub-carrier or the at least one OFDMA sub-carrier.

Figure 3C:
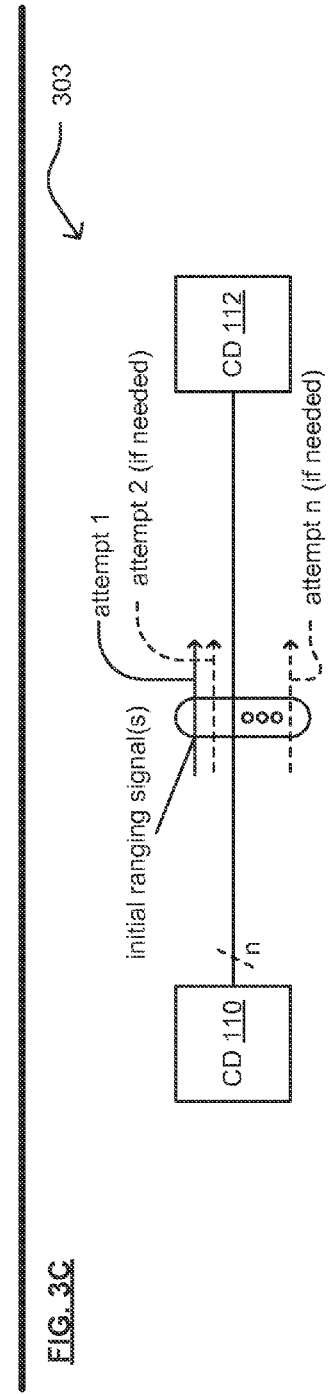
FIG. 3C is a diagram illustrating another example of a communications between CDs within one or more communication systems.

FIG. 3C is a diagram illustrating another example 303 of a communications between CDs within one or more communication systems. In an example of operation, the CD 110 generates a first ranging signal using on the initial power. The CD 110 then transmits the first ranging signal to the CD 112 within an attempt 1. The CD 110 then determines, when and if a ranging response to the first ranging signal is received from the CD 112, that the CD 110 is successfully ranged to the CD 112. Note that many of the examples provided herein operate based on initial ranging (e.g., such as with respect to the examples 203 and 204 of FIG. 2C and FIG. 2D). Again, note that a full ranging process may include multiple processes, operations, etc. (e.g., such as including multiple operations such as initial ranging, fine ranging, etc. as in examples 203 and 204 described below with respect to FIG. 2C and FIG. 2D).

The CD 110 then generates, when no ranging response to the first ranging signal is received from CD 112, a second ranging signal based on the initial power and at least one power step and transmits the second ranging signal to the CD 112 within an attempt 2. If the CD 110 has not yet been successfully ranged to the CD 112, the CD 110 then generates another (e.g., up to an $n^{th}$) ranging signal based on the initial power and the at least one power step and transmits the another (e.g., up to an $n^{th}$) ranging signal to the CD 112 within another attempt (e.g., up to an $n^{th}$).

As described herein, certain examples of operation provide that the CD 112 directs the CD 110 at least one operational parameter (e.g., initial transmit power, at least one step between at least two power levels such as between the initial transmit power level and another power level and/or between the another power level and at least one other power level, etc.) for use by the CD 110 to perform ranging with the CD 112.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 to 4096 quadrature amplitude modulation (QAM), 32 amplitude and phase shift keying (APSK), etc., uncoded modulation, and/or any other desired types of modulation including higher ordered modulations that may include even greater number of constellation points (e.g., generally $2^n$ QAM, where n is a positive integer greater than or equal to 2, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 4A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 4E is a diagram illustrating an example 405 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface configured to process received OFDM or OFDMA symbols and/or frames (and/or SC symbols and/or frames) and to generate such OFDM or OFDMA symbols and/or frames (and/or SC symbols and/or frames).

The processor and/or the communication interface of the communication device are configured to generate, transmit, receive, and process various signals including OFDM/A related signals to perform ranging as described herein.

Note that such ranging operations and communications as described herein may be performed within a communication system that operates in accordance with DOCSIS 3.1, which is OFDM/A based. Certain DOCSIS 3.1 related specifications that may be used within such ranging operations and communications are provided below:

Transmission power (Data): Max transmission power: 53 dBmV/1.6 MHz, and Min transmission power: 17 dBmV/1.6 MHz.

Data receive level (min set point)

Between 4 dBmV/1.6 MHz to −10 dBmV/1.6 MHz (note that figures in the table are for 6.4 MHz, 6 dB are subtracted to get numbers for 1.6 MHz)

Minimum supported constellation depends on set point

Attenuation range: Max Attenuation: 63 dB, and Min attenuation: 13 dB (Neglecting additional offset range).

IR transmission power setting must support full dynamic range of attenuation between any CM to the CMTS and also support full dynamic range of minimal CNRs requirements per constellation (11 to 43 dB).

Constellation sizes and required SNRs (6.4 MHz)

FIG. 5A is a diagram illustrating an example 501 of upstream (US) channel demodulator input power characteristics based on DOCSIS 3.1 physical layer (PHY) specifications.

FIG. 5B is a diagram illustrating an example 502 of cable modem termination system (CMTS) carrier to noise ratio (CNR) performance in an additive white Gaussian noise (AWGN) channel based on DOCSIS 3.1 PHY specifications.

FIG. 6A is a diagram illustrating an example 601 of maximum transmission (TX) initial ranging (IR) power vs. received power set point. This disclosure proposes a novel ranging operation in which the CMTS informs a to-be-ranged CM the initial ranging (IR) transmission power. This can be included within an upstream (US) channel descriptor (UCD) that is provided from the CMTS to the to-be-ranged CM. This can be provided via a ranging instruction signal. The CM then uses this IR transmission power when transmitting its first IR signal. The CMTS can set the IR TX power according to various different system parameters including: 1. Received Level Set Point, 2. Max constellation supported in the "best" profile, and/or 3. Guardband width and receive window size. Note that the width and receive window size can be specifies not only as a function of time but also of frequency. This can specify those sub-carriers on which the new CMs can transmit. Prior ranged CMs can use other frequencies/sub-carriers for transmissions.

Note that this approach to performing ranging can reduce the number of trials of IR TX power, reducing Initial Ranging duration significantly. Consider the following example in which the CMTS sets the IR TX power for the to-be-ranged CM.

EXAMPLE 1

The CMTS sets the IR TX power according to the received power set point. This diagram shows four different IR transmission power for different receiver (RX) power set points, and the constellation size that is supported with each respective set point.

In this diagram, note that as the constellation size decreases, more initial ranging (IR) transmission power is allowed because more interference can be allowed while still performing successful ranging operations. As can be seen with reference to this diagram, the initial ranging (IR) transmission power is determined by CMTS, and the max. initial ranging (IR) transmission power is selected so that the ranging transmissions from the to-be-ranged CM will not interfere with transmissions from other CMs.

FIG. 6B is a diagram illustrating an example 602 of maximum and minimum supported attenuation vs. constellation size. This diagram shows:
 1. Max attenuation=max TX power−RX set point
 2. Min attenuation=min TX power−RX set point
 Note that the dashed line show attenuations with the higher RX set point.

FIG. 6C is a diagram illustrating an example 603 of maximum allowed IR receiver (RX) power above data RX power vs. received data CNR. This diagram also shows different respective set points based on maximum and minimum attenuation.

FIG. 6D is a diagram illustrating an example 604 of guardband and window size. This diagram shows inter-code interference (ICI) due to the IR signal that interfere with data is a function of the highest constellation size for each set point and the required CNR. This can allow a degradation of 0.5 dB (~9 dB below noise). When assuming spurious emission is −60 dBc, then guardband and window size reduce IR leakage below spurious emissions.

This diagram shows interference of an initial ranging (IR) signal from a to-be-ranged CM with data signals transmitted by other CMs. The initial ranging (IR) inter-channel interference (ICI) (e.g., between channel of initial ranging (IR) signal and other sub-carriers/channels used for data transmissions by other CMs) needs to be set low enough so as not to interfere with those data transmissions by other CMs. The CMTS can then define how much higher power of the IR signal can be than the power transmissions by other CMs.

The difference between the data received level and the maximum signal level between the guard bands (e.g., required SNR vs. data) provided the D shown in the diagram. When the D is known, and then when the data received level is known, then the CMTS can tell the new CM which transmit power it is directed and/or allowed to use for initial ranging (IR).

Also, in some examples, once the CNR is known, the CMTS may want interference to be a certain amount (e.g., 10 dB) below the noise, and the CMTS can then see level of interference that the initial ranging (IR) is allowed to use.

From certain perspectives, this value, D, corresponds to the amount of power that to-be-ranged CM can use for the initial ranging (IR) transmission so that it does not go above initial ranging (IR) ICI (e.g., because the CMTS will have an idea of how the roll-off behaves).

When D is known as shown in the diagram (e.g., difference between the data received level and the maximum signal level between the guard bands), the transmit (TX) power can be calculated as follows:

$$TX\ power = IR\ ICI\ power + D + min\ attenuation$$

FIG. 7A is a diagram illustrating another example 701 of maximum TX IR power vs. input CNR. This diagram shows transmission power limitations on the IR signal to prevent interference. Considering the example of a communication system including a CMTS and a number of CMs, the CMTS selects an initial transmission power level for a to-be-ranged CM so that its ranging communications do not interfere with other communications from other CMs (e.g., such as concurrent communications such as based on OFDMA upstream (US) communications from more than one CM to the CMTS). The CMTS selects an initial transmission power level for a to-be-ranged CM so that its ranging communications does not interfere with communications from other CMs.

In this diagram, this is shown as a function of the CNR of the received power set point and CNR (equivalent to max constellation supported). When CNR is lower higher ICI can be used therefore higher IR transmission power is allowed, and shows maximal degradation due to IR is 0.5 dB.

Calculations of max allowed IR transmission power is calculated as follows:

With 4096-QAM (set point is 4 dBmV/1.6 MHz):

IR *RX* level 8 dB above set point level (60–52)

IR *RX* level: 4+8=12 dBmV

Minimal attenuation: 13 dB (17–4)

Max allowed IR *TX* power: 12+13=25 dBmV

With 1024-QAM

IR *RX* level 15.5 dB above set point level (60–44.5)

IR *RX* level: −6+15.5 dBmV=9.5 dBmV

Minimal attenuation: 23 dB (17–(−6))

Max allowed IR *TX* power: 9.5+23=32.5 dBmV

In this example 701, note that transmission power is set according to the RX set points and not according to the CNR. When CNR is lower, then a higher ICI can be allowed and therefore higher IR transmission power is allowed. This is not increased with CNR within same set point. This limits IR performance at high attenuations but allow an easy way to set the transmission power that is independent of the attenuation of the initial ranged modem.

FIG. 7B is a diagram illustrating an example 702 of received IR CNR vs. data CNR. This diagram shows CNR of initial ranging (IR) when attenuation is large. The IR requires CNR of 3.5 dB with a mis-detection probability of 1% (e.g., reception is successful in at least 99% of the time). Actual IR CNR can be calculated (per constellation) as follows:

IR_CNR=(*RX* IR level−data received (*RX*) level)+ data CNR

*RX* IR=*TX* IR power−attenuation

FIG. 7C is a diagram illustrating another example 703 of guardband and window size. Initial ranging (IR) can be detected with a good probability over the whole expected CNR range when transmission power is set according to the received power set point. In extreme cases when it cannot be detected, power will be raised after some number of attempts.

FIG. 7D is a diagram illustrating an example 704 of maximum TX IR power vs. maximum received data constellation size of other prior-ranged received CMs sharing the same OFDMA frame used for initial ranging (IR). This diagram shows transmission power limitations on the IR signal to prevent interference as a function of the constellation size of the received data. Note that constellation size and CNR are tightly related as described in the tables of FIG. 5A and FIG. 5B.

When constellation size is smaller, more ICI can be allowed and therefore larger transmission power for the IR can be allowed. This diagram right shows the maximal initial ranging power that can be transmitted with no interference to data as a function of the maximal constellation size used. IR performance can be estimated as a function of the transmission power, CNR and the max expected attenuation.

FIG. 8A is a diagram illustrating another example 801 of received IR CNR vs. constellation size. This diagram shows the SNR of initial ranging (IR) when attenuation is large, and the IR requires SNR of 3.5 dB with a miss-detection probability of 1% (e.g., reception is successful in at least 99% of the time). Actual IR SNR can be calculated as follows (per constellation) as follows:

IR_SNR=(*RX* IR level−data received (*RX*) level)+ data SNR

*RX* IR=*TX* IR power−attenuation

FIG. 8B is a diagram illustrating another example 802 of guardband and window size.

This diagram shows additional margins so that TX IR power can be reduced by approximately 7 dB.

FIG. 8C is a diagram illustrating an example 803 of RX window frequency response. This diagram shows Raised Cosine Window Frequency Response based on the ranging operations described herein.

Point of 40 dB attenuation: 1.2 MHz with RP=64, 0.6 MHz with RP=128, 0.4 MHz with RP=192, 0.25 MHz with RP=256.

Point of 50 dB attenuation: 2 MHz with RP=64, 1 MHz with RP=128, 0.7 MHz with RP=192, 0.5 MHz with RP=256.

Point of 60 dB attenuation: 2.7 MHz with RP=64, 1.4 MHz with RP=128, 1.0 MHz with RP=192, 0.7 MHz with RP=256.

These calculations are performed assuming an ideal floating point implementation.

FIG. 8D is a diagram illustrating an example 804 of initial ranging forward error correction (FEC) performance. With a SNR of 1.5 dB, more than 93% of the ranging transmissions will be detected by the CMTS. In other words, with a SNR of 1.5 dB, approximately only 7% of the initial ranging (IR) transmissions will fail to be detected by the CMTS and require at least one additional ranging transmission to be made from the to-be-ranged CM to the CMTS. Note that with a SNR of 3.5 dB, a near-zero word error rate of 0.018% is achieved in this example 804.

FIG. 9A is a diagram illustrating an embodiment of a method 901 for execution by one or more communication devices. The method 901 begins by receiving (e.g., via a communication interface of the communication device) a ranging instruction signal from another communication device (block 910). In some examples, the instruction signal includes an initial power and at least one power step. The method 901 continues by processing the ranging instruction signal to determine the initial power and the at least one power step (block 920). The method 901 then operates by generating a first ranging signal based on the initial power (block 930).

The method 901 continues by transmitting (e.g., via the communication interface of the communication device) the first ranging signal to the another communication device (block 940). The method 901 then operates by determining whether a ranging response to the first ranging signal is received from the another communication device (decision block 950).

The method 901 continues by determining, when a ranging response to the first ranging signal is received from the another communication device (based on a favorable comparison per the decision block 950), that the communication device is successfully ranged to the another communication device (block 970).

The method 901 continues by generating, when no ranging response to the first ranging signal is received from the another communication device (based on an unfavorable comparison per the decision block 950), a second ranging signal based on the initial power and the at least one power step and transmitting (e.g., via the communication interface of the communication device) the second ranging signal to the another communication device (block 960).

FIG. 9B is a diagram illustrating another embodiment of a method 902 for execution by one or more communication devices. The method 902 begins by receiving receive at least one communication from at least one first other communication device (block 911). The method 902 continues by processing the at least one communication to determine at least one characteristic of the at least one communication (block 921). The method 902 then operates by determining, based on the at least one characteristic of the at least one communication, an initial power and at least one power step for use by a second other communication device when performing ranging with the communication device (block 931).

The method 902 continues by transmitting a ranging instruction signal to the second other communication device that includes the initial power and the at least one power step (block 941). The method 902 then operates by receiving a ranging signal from the second other communication device that is based on at least one of the initial power or the at least one power step (block 951). The method 902 continues by generating, in response to the ranging signal, a ranging response and transmitting the ranging response to the second other communication device indicating that the second other communication device is successfully ranged to the communication device (block 961).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
    a communication interface; and
    a processor, at least one of the processor or the communication interface configured to:
        receive a ranging instruction signal from another communication device that includes an initial power, at least one power step, and information that specifies at least one of orthogonal frequency division multiplexing (OFDM) sub-carriers or orthogonal frequency division multiple access (OFDMA) sub-carriers to be used by the communication device in accordance with initial ranging (IR) with the another communication device;
        process the ranging instruction signal to determine the initial power, the at least one power step, and the at least one of the OFDM sub-carriers or the OFDMA sub-carriers;
        generate a first ranging signal based on the initial power;
        transmit the first ranging signal to the another communication device via the at least one of the OFDM sub-carriers or the OFDMA sub-carriers;
        determine, when a ranging response to the first ranging signal is received from the another communication device, that the communication device is successfully initially ranged to the another communication device to determine at least one of another initial power or a timing adjustment for communications between the communication device and the another communication device; and
        generate, when no ranging response to the first ranging signal is received from the another communication device, a second ranging signal based on the initial power and the at least one power step and transmit the second ranging signal to the another communication device via the at least one of the OFDM sub-carriers or the OFDMA sub-carriers; and
        after the communication device is successfully initially ranged to the another communication device, execute a fine ranging process with the another communication device to determine at least one of another power or another timing adjustment for the communications between the communication device and the another communication device.

2. The communication device of claim 1, wherein the at least one of the processor or the communication interface is further configured to:
    generate, when no ranging response to the second ranging signal is received from the another communication device, a third ranging signal based on the initial power and the at least one power step and transmit the third ranging signal to the another communication device, wherein the third ranging signal has a power that is greater than the second ranging signal by the at least one power step.

3. The communication device of claim 1, wherein the at least one of the processor or the communication interface is further configured to:
    receive the ranging instruction signal from the another communication device, wherein the ranging instruction signal also includes at least one of a receive level set point, a constellation size, a guardband width, or a receive window size;
    process the ranging instruction signal to determine the at least one of the receive level set point, the constellation size, the guardband width, or the receive window size; and
    generate the first ranging signal based on the at least one of the receive level set point, the constellation size, the guardband width, or the receive window size.

4. The communication device of claim 1, wherein the initial power is selected by the another communication device based on at least one characteristic of at least one communication between the another communication device and at least one other communication device so that at least one additional communication between the another communication device and the at least one other communication device is unaffected by the first ranging signal.

5. The communication device of claim 4, wherein the at least one characteristic corresponds to at least one of inter-code interference (ICI), inter-symbol interference (ISI), a minimum signal to noise ratio (SNR) used for data, an attenuation level, an OFDM sub-carrier assignment, or an OFDMA sub-carrier assignment.

6. The communication device of claim 1, wherein the at least one of the processor or the communication interface is further configured to:
   transmit the first ranging signal to the another communication device using a first at least one OFDM sub-carrier or at least one OFDMA sub-carrier when at least one other communication device transmits at least one other signal to the another communication device using a second at least one OFDM sub-carrier or the at least one OFDMA sub-carrier.

7. The communication device of claim 1 further comprising:
   a cable modem, wherein the another communication device includes a cable headend transmitter or a cable modem termination system (CMTS).

8. The communication device of claim 1, wherein the at least one of the processor or the communication interface is further configured to:
   support communications within at least one of a satellite communication system, a wireless communication system, a wired communication system, a fiber-optic communication system, or a mobile communication system.

9. A communication device comprising:
   a communication interface; and
   a processor configured to:
      receive at least one communication from at least one first other communication device;
      process the at least one communication to determine at least one characteristic of the at least one communication;
      determine, based on the at least one characteristic of the at least one communication, an initial power, at least one power step, and at least one of orthogonal frequency division multiplexing (OFDM) sub-carriers or orthogonal frequency division multiple access (OFDMA) sub-carriers to be used in accordance with initial ranging (IR) by a second other communication device when performing ranging with the communication device;
      transmit a ranging instruction signal to the second other communication device that includes the initial power, the at least one power step, and the at least one of the OFDM sub-carriers or the OFDMA sub-carriers;
      receive a ranging signal from the second other communication device via the at least one of the OFDM sub-carriers or the OFDMA sub-carriers that is based on at least one of the initial power or the at least one power step;
      generate, in response to the ranging signal, a ranging response and transmit the ranging response to the second other communication device indicating that the second other communication device is successfully initially ranged to the communication device to determine at least one of another initial power or a timing adjustment for communications between the communication device and the second other communication device; and
      after the communication device is successfully initially ranged to the second other communication device, execute a fine ranging process with the second other communication device to determine at least one of another power or another timing adjustment for the communications between the communication device and the second other communication device.

10. The communication device of claim 9, wherein the ranging instruction signal also includes at least one of a receive level set point, a constellation size, a guardband width, or a receive window size.

11. The communication device of claim 9, wherein the at least one characteristic of the at least one communication corresponds to at least one of inter-code interference (ICI), inter-symbol interference (ISI), a minimum signal to noise ratio (SNR) used for data, an attenuation level, an OFDM sub-carrier assignment, or an OFDMA sub-carrier assignment.

12. The communication device of claim 9 further comprising:
    a cable headend transmitter or a cable modem termination system (CMTS), and wherein the second other communication device includes a cable modem.

13. The communication device of claim 9, wherein the at least one of the processor or the communication interface is further configured to:
    support communications within at least one of a satellite communication system, a wireless communication system, a wired communication system, a fiber-optic communication system, or a mobile communication system.

14. A method for execution by a communication device, the method comprising:
    receiving, via a communication interface of the communication device, a ranging instruction signal from another communication device that includes an initial power, at least one power step, and information that specifies at least one of orthogonal frequency division multiplexing (OFDM) sub-carriers or orthogonal frequency division multiple access (OFDMA) sub-carriers to be used by the communication device in accordance with initial ranging (IR) with the another communication device;
    processing the ranging instruction signal to determine the initial power, the at least one power step, and the at least one of the OFDM sub-carriers or the OFDMA sub-carriers;
    generating a first ranging signal based on the initial power;
    transmitting, via the communication interface of the communication device, the first ranging signal to the another communication device via the at least one of the OFDM sub-carriers or the OFDMA sub-carriers;
    determining, when a ranging response to the first ranging signal is received from the another communication device, that the communication device is successfully initially ranged to the another communication device to determine at least one of another initial power or a timing adjustment for communications between the communication device and the another communication device; and
    generating, when no ranging response to the first ranging signal is received from the another communication device, a second ranging signal based on the initial power and the at least one power step and transmitting, via the communication interface of the communication device, the second ranging signal to the another communication device via the at least one of the OFDM sub-carriers or the OFDMA sub-carriers; and
    after the communication device is successfully initially ranged to the another communication device, executing a fine ranging process with the another communication device to determine at least one of another power or another timing adjustment for the communications between the communication device and the another communication device.

15. The method of claim 14 further comprising:

generating, when no ranging response to the second ranging signal is received from the another communication device, a third ranging signal based on the initial power and the at least one power step and transmitting, via the communication interface of the communication device, the third ranging signal to the another communication device, wherein the third ranging signal has a power that is greater than the second ranging signal by the at least one power step.

16. The method of claim 14 further comprising:

receiving, via the communication interface of the communication device, the ranging instruction signal from the another communication device, wherein the ranging instruction signal also includes at least one of a receive level set point, a constellation size, a guardband width, or a receive window size;

processing the ranging instruction signal to determine the at least one of the receive level set point, the constellation size, the guardband width, or the receive window size; and generating the first ranging signal based on the at least one of the receive level set point, the constellation size, the guardband width, or the receive window size.

17. The method of claim 14, wherein:

the initial power is selected by the another communication device based on at least one characteristic of at least one communication between the another communication device and at least one other communication device so that at least one additional communication between the another communication device and the at least one other communication device is unaffected by the first ranging signal; and the at least one characteristic corresponds to at least one of inter-code interference (ICI), inter-symbol interference (ISI), a minimum signal to noise ratio (SNR) used for data, an attenuation level, an OFDM sub-carrier assignment, or an OFDMA sub-carrier assignment.

18. The method of claim 14 further comprising:

transmitting, via the communication interface of the communication device, the first ranging signal to the another communication device using a first at least one OFDM sub-carrier or at least one OFDMA sub-carrier when at least one other communication device transmits at least one other signal to the another communication device using a second at least one OFDM sub-carrier or the at least one OFDMA sub-carrier.

19. The method of claim 14, wherein the communication device includes a cable modem, wherein the another communication device includes a cable headend transmitter or a cable modem termination system (CMTS).

20. The method of claim 14 further comprising:

operating the communication interface of the communication device to support communications within at least one of a satellite communication system, a wireless communication system, a wired communication system, a fiber-optic communication system, or a mobile communication system.

* * * * *